Oct. 30, 1923.
G. A. GLENN
1,472,646
MOLDING FLASK
Filed June 10, 1922
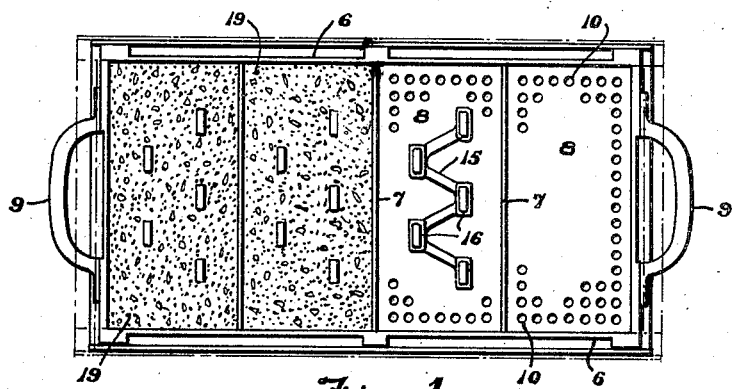
Fig. 1.
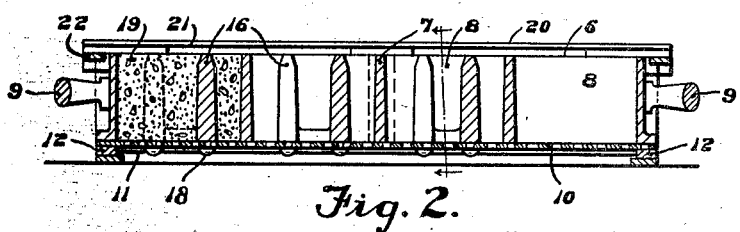
Fig. 2.
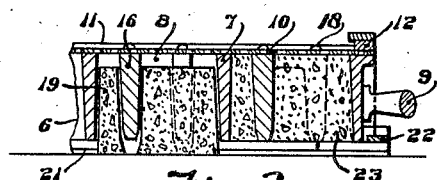
Fig. 3.
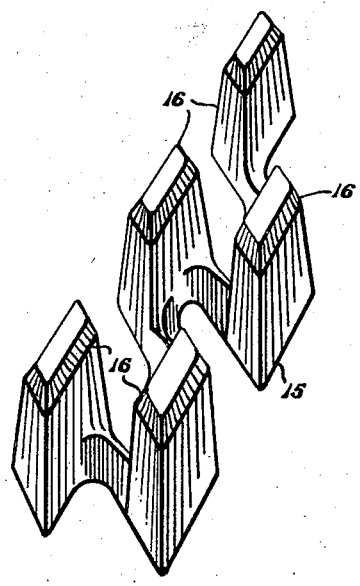
Fig. 5.
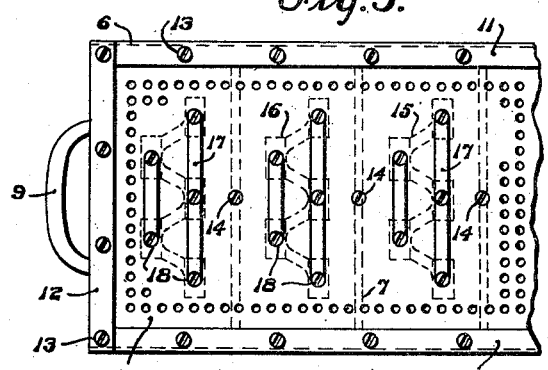
Fig. 6.
Fig. 4.
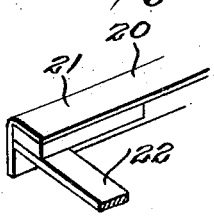
George A. Glenn.
INVENTOR
BY Victor J. Evans
ATTORNEY
WITNESS:

Patented Oct. 30, 1923.

1,472,646

UNITED STATES PATENT OFFICE.

GEORGE A. GLENN, OF LAWNDALE, PENNSYLVANIA.

MOLDING FLASK.

Application filed June 10, 1922. Serial No. 567,353.

*To all whom it may concern:*

Be it known that I, GEORGE A. GLENN, a citizen of the United States, residing at Lawndale, in the county of Philadelphia and State of Pennsylvania, have invented new and useful Improvements in Molding Flasks, of which the following is a specification.

This invention relates to molding flasks or boxes and it has more particular reference to molding boxes which are primarily devised for the molding of bricks, blocks and analogous articles from plastic or cementitious materials such as are used in building operations and constructional work in general.

The primary object of this invention is to provide a molding box or flask which will permit the aggregate mould to automatically leave the said molding box or flask without fear or danger of its disruption or disfigurement, it being a well known fact that when a molding box or flask used for the purpose of making bricks or building blocks from aggregate or clay when reversed or turned upside down involves the not infrequent disfigurement of the moulded articles, due to the suction or adhesion caused by the air at the back of the mould creating a vacuum.

Another object of this invention is to provide a molding box or flask upon the top of which there is placed a covering of perforate or reticulate material which allows the air to enter to the upper face of the aggregate when the molding box or flask is being dumped and thereby effectively avoiding any vacuum trouble.

A further object of this invention is to provide a molding box or flask of the type above referred to which is characterized by a clearance when dumped so that in the dumping operation a shock or impact is given the contents of the mould which results in the easy slippage of the mould or moulds from said molding box or flask.

A still further object of this invention is to provide a molding box or flask which can be easily adapted for the production of either solid or perforate moulded articles such as solid blocks or bricks; or blocks or bricks having air spaces therethrough.

With the foregoing and other objects in view as will be more clearly apparent from the following description my invention consists essentially in the novel features of construction, combinations and arrangements of parts hereinafter more particularly described and specifically defined by the subjoined claims.

In the further disclosure of the invention reference is to be had to the accompanying sheet of explanatory drawings constituting a part of this specification and in which like characters of reference designate the same or corresponding parts in all the views.

Figure 1 is an underside plan view of my novel molding box or flask, the dot-and-dash lines designating a frame hereinafter more specifically referred to.

Figure 2 is a longitudinal central section through the same and showing the frame above referred to in full lines.

Figure 3 is a fragmentary longitudinal section illustrating the manner in which the moulded articles leave the molding box or flask.

Figure 4 is a fragmentary top plan view of my novel molding box or flask; and,

Figure 5 is a perspective view of a multiple core member hereinafter more particularly described.

Figure 6 is a perspective fragmentary view of the elevating frame.

Referring more particularly to the views which are illustrative of one practical embodiment of my invention only, I construct a rectangular frame or flask 6 from aluminum or other suitable material, said frame or flask being divided by transverse partitions 7 to provide a series of rectangular moulds 8. The rectangular frame or flask 6 is provided at its ends with integral or attached handles 9 whereby it may be easily carried or inverted as desired. Over the top face of the aforesaid rectangular frame or flask I fit a cover 10 of perforate or reticulate material, the same being secured to the rectangular edges and transverse edges of the said frame or flask by means of metallic strips 11, 12, respectively, the same being secured in place by countersunk or similar screws 13. In order to further secure the cover 10 of perforate or reticular material to the frame or flask, I may insert one or more screws 14 into the top edges of the hereinbefore mentioned transverse partitions 7.

When it is desired that the frame or flask 6 should be used for the molding of apertured bricks or blocks which would readily lend themselves to interlocking connection or which can be broken with ease at any desired position for filling odd spaces or completing lines of masonry, I fit into each of the moulds 8 what I term a multiple core member 15 having integrally formed core pieces 16 of appropriate cross section which will produce correspondingly shaped holes or apertures through the bricks or blocks produced by my novel molding frame or flask. These multiple core members 15 are secured to the cover 10 of perforate or reticulate material by means of strips 17 and screws 18, it being obvious that this method of attaching the multiple core members provides a simple and effective means whereby the said multiple core members 15 can be readily removed or set in place. Thus it will be seen there is provided a simple means whereby my novel molding box or flask can be used for the production of solid bricks or for the production of apertured bricks or blocks 19 as shown.

It is to be here particularly noted that I form the walls of the rectangular frame or flask 6 as well as the transverse partition 7 with a slight chamfer or draft from the top end to the bottom or dumping end.

In order to provide a simple and effective means whereby the dumping operation may be easily effected, or in other words, whereby the mould may be elevated in its inverted position to provide an appropriate space therebetween and the palate or block receiving board (not shown), and allow the blocks to fall from the mould as clearly shown in Figure 3 of the drawings, I preferably make use of a rectangular iron or other appropriate material frame 20 comprising longitudinal members 21 and transverse members 22, said frame being preferably made of approximately quarter inch thick material and said frame is likewise made a friction-fit so that when placed over the bottom of the mould before the dumping operation takes place, it is effectively retained in place when the molding flask or box is inverted to release the contents of the moulds. Or, I may provide said frame with a clamping means for attaching it to the rectangular frame or flask 6, but I have found in actual practice that when said frame is made a friction-fit it is perfectly effective for the purpose for which it is intended.

In use it will be readily apparent that whether or not my novel molding box or flask is intended for the molding of solid or apertured bricks or blocks it will be inverted, that is to say, the cover face 10 of perforate or reticulate material will be turned downwards upon the ground or other surface on which the molding operation takes place. The several moulds 8 will then be filled with the required aggregate and slaked. The frame 20 will then be placed upon the bottom of the molding box or flask 6 whereupon the box or flask 6 can be readily carried by the handles 9 to the place where it is desired that the bricks or blocks 19 are to be dumped. An examination of the drawings and more particularly Figures 1 to 3 inclusive, will fully explain the aforesaid operation, the latter figure in particular illustrating the ease with which the apertured brick 19 leaves the mould or flask due to the slight drift in the walls and partitions of the molding box or flask. With reference to Figure 3 it is to be particularly observed that I have shown one apertured brick 23 as not having left the molding box or flask while the other apertured brick or block 19 is shown released therefrom, this illustration being intended to more particularly emphasize the fact that the perforate or reticulate material cover 10 allows air to enter to the aggregate as the same is being dumped and hence avoiding the creation of any vacuum, but it is to be clearly understood that the position of the apertured brick or block 23 is only illustrative of this point, in that all the bricks or blocks will be automatically released when the molding box or flask 6 is inverted for dumping.

From the foregoing description and an examination of the drawings it will be perfectly clear and apparent to those acquainted with the art that I have provided a very practical and efficient molding box or flask for the molding or forming of bricks or blocks of any desired shape and configuration and I wish it particularly understood that the embodiment illustrated is only by way of example. Whilst there has been shown and described one practical embodiment of the invention the same is not to be construed in any restricted sense as it will be obvious the same is susceptible of structural changes and variations for the production of different bricks, blocks or other analogous articles without departing from the essential feature thereof; to wit, the provision of a molding box or flask having a perforate or reticulate material cover for the purposes hereinbefore fully described and in addition thereto having an associated frame for providing the necessary clearance when the molding box or flask is inverted for dumping purposes. The right is therefore hereby reserved to make such changes and variations as fairly lie within the scope of the appended claims.

Having described my invention, what I claim as new and desire to secure by Letters Patent is:

1. A molding box divided by partitions into a series of moulds and having a perforated face covering attached thereto, in combination with a removable bottom frame for providing a dumping clearance.

2. A molding box divided by partitions into a series of moulds, a perforated face covering attached thereto, and a multiple core member removably attached in each of said moulds, said molding box, partitions and multiple core members having a slight chamfer for dumping.

3. A molding box divided by partitions into a series of moulds, a perforated face covering attached thereto, and a core member removably attached in each of said moulds, in combination with a removable bottom frame for providing a dumping clearance.

4. A molding box divided by partitions into a series of moulds, a perforated face covering attached thereto, and a multiple core member removably attached in each of said moulds, said molding box, partitions and multiple core members having a slight chamfer for dumping, in combination with a removable bottom frame for providing a dumping clearance.

In testimony whereof I affix my signature.

GEORGE A. GLENN.